United States Patent
Kori

(10) Patent No.: US 12,332,744 B2
(45) Date of Patent: Jun. 17, 2025

(54) METHOD AND SYSTEM FOR MEDIA ERROR RECOVERY

(71) Applicant: Avago Technologies International Sales Pte. Limited, Singapore (SG)

(72) Inventor: Sumalatha Kori, Bangalore (IN)

(73) Assignee: Avago Technologies International Sales Pte. Limited, Singapore (SG)

( * ) Notice: Subject to any disclaimer, the term of this patent is extended or adjusted under 35 U.S.C. 154(b) by 83 days.

(21) Appl. No.: 18/472,786

(22) Filed: Sep. 22, 2023

(65) Prior Publication Data

US 2025/0103433 A1    Mar. 27, 2025

(51) Int. Cl.
*G06F 11/00* (2006.01)
*G06F 11/10* (2006.01)

(52) U.S. Cl.
CPC ................................ *G06F 11/1088* (2013.01)

(58) Field of Classification Search
CPC ............. G06F 11/1076; G06F 11/1088; G06F 11/1092; G06F 3/061–0619
See application file for complete search history.

(56) References Cited

U.S. PATENT DOCUMENTS

| | | | |
|---|---|---|---|
| 6,799,284 B1* | 9/2004 | Patel | G06F 11/1076 714/6.21 |
| 2018/0113761 A1 | 4/2018 | Ko et al. | |
| 2020/0105359 A1* | 4/2020 | Buxton | G06F 11/3055 |
| 2020/0341844 A1* | 10/2020 | Shivanand | G06F 11/1088 |

OTHER PUBLICATIONS

Extended European Search Report on EP Appln. No 2419607938 dated Feb. 19, 2025.

* cited by examiner

*Primary Examiner* — Marc Duncan
(74) *Attorney, Agent, or Firm* — Foley & Lardner LLP

(57) ABSTRACT

In some aspects, a method may include identifying, by one or more processors, a presence of an error in a plurality of data storage units in a range of data storage units of an error bitmap of a redundant array of independent disks (RAID). The method may include generating, by the one or more processors, a parity RAID request format (PRRQ) frame, the PRRQ frame identifying the range of data storage units, where at least one data storage unit has an error, the range of data storage units identified at least in the plurality of data storage units. The method may include communicating, by the one or more processors, the PRRQ frame to a controller, the controller is configured, responsive to the PRRQ frame, to recover the data in the range of data storage units in the plurality of data storage units.

20 Claims, 10 Drawing Sheets

400

| Offset\Bit | 31 30 29 28 27 26 25 24 | 23 22 21 20 19 18 17 16 | 15 14 13 12 11 10 9 8 | 7 6 5 4 3 2 1 0 |
|---|---|---|---|---|
| 0x00 | Function = 0xD5 | Opcode | Parent LMID | |
| 0x04 | Message Flags | Flags | HW Context | Next LMID |
| 0x08 | Device Handle | | | |
| 0x0C | Extension LMID or Lead ISGL ID | | Counter or Coefficients Index | |
| 0x10 | Stripe Number (31 : 0) | | Offset in Row | Span | RowMod |
| 0x14 | Number of Blocks | | Stripe Number (47 : 32) | |

Blocks

| 0 | 1 | 2 | 3 | 4 | 5 | 6 | 7 | 8 | 9 | 10 | 11 | 12 | 13 | 14 | 15 |

Arm0

| 0 | 1 | 2 | 3 | 4 | 5 | 6 | 7 | 8 | 9 | 10 | 11 | 12 | 13 | 14 | 15 |

Arm1

| 0 | 1 | 2 | 3 | 4 | 5 | 6 | 7 | 8 | 9 | 10 | 11 | 12 | 13 | 14 | 15 |

Parity

| 0 | 1 | 2 | 3 | 4 | 5 | 6 | 7 | 8 | 9 | 10 | 11 | 12 | 13 | 14 | 15 |

Blocks

| 0 | 1 | 2 | 3 | 4 | 5 | 6 | 7 | 8 | 9 | 10 | 11 | 12 | 13 | 14 | 15 |

Arm0

| 0 | 1 | 2 | 3 | 4 | 5 | 6 | 7 | 8 | 9 | 10 | 11 | 12 | 13 | 14 | 15 |

Arm1

| 0 | 1 | 2 | 3 | 4 | 5 | 6 | 7 | 8 | 9 | 10 | 11 | 12 | 13 | 14 | 15 |

Parity

| 0 | 1 | 2 | 3 | 4 | 5 | 6 | 7 | 8 | 9 | 10 | 11 | 12 | 13 | 14 | 15 |

Blocks

| 0 | 1 | 2 | 3 | 4 | 5 | 6 | 7 | 8 | 9 | 10 | 11 | 12 | 13 | 14 | 15 |

Arm0

| 0 | 1 | 2 | 3 | 4 | 5 | 6 | 7 | 8 | 9 | 10 | 11 | 12 | 13 | 14 | 15 |

Arm1

| 0 | 1 | 2 | 3 | 4 | 5 | 6 | 7 | 8 | 9 | 10 | 11 | 12 | 13 | 14 | 15 |

Parity

| 0 | 1 | 2 | 3 | 4 | 5 | 6 | 7 | 8 | 9 | 10 | 11 | 12 | 13 | 14 | 15 |

FIG. 7

METHOD AND SYSTEM FOR MEDIA ERROR RECOVERY

BACKGROUND

The present disclosure relates generally to the field of recovery in the event of media error. Media error can be an indication of a physical problem on a hard disk, which can occur while performing an input/output (I/O) operation. When the hard disk is unable to perform a read and write operation on a physical block of data, the hard disk reports a media error. A controller of a redundant array of independent disks (RAID) can intervene to recover the block having the media error.

SUMMARY OF THE INVENTION

In a RAID system, the media errors can refer to errors or faults that occur on the individual disks within the RAID array. The media errors can include bad sectors, read and write failures, or any other issues that may affect the integrity or availability of data stored on the disks. For detecting media errors in the input/output (I/O) range, RAID systems employ a bitmap. The bitmap can be a data structure that uses a series of bits to represent the status or condition of certain data storage units, for example, the sectors within the I/O range. An error bitmap can refer to a data structure or representation used to track and manage errors or anomalies within a larger system, such as a file, network, or computer memory. The error bitmap can include a plurality of individual bits, where each bit corresponds to a specific element, event, or condition within the system being monitored.

Typically, the media errors detected in the I/O range (for example, in a 64K range subject to an I/O operation or series of I/O operations) can be maintained by the RAID in the bitmap. The bitmap can be designed to cover a specific range of sectors (for example, in the 64K range). Each bit in the bitmap corresponds to a sector within the range, indicating whether the sector is error-free or if it has a media error. The bitmap can be organized in a way that one bit represents one sector, or multiple bits can represent a group of sectors, depending on the design of the RAID system.

When a media error occurs in any of the sectors within the I/O range, the corresponding bit in the bitmap is marked or set to indicate the presence of the error. This allows the RAID system to identify and locate the affected sectors without performing a full scan or read operation on every sector in the range. Through the bitmap, the RAID system can track and manage the media errors within the I/O range. This information allows implementation of appropriate error handling and recovery strategies. For example, the RAID system can initiate processes such as data reconstruction, error correction, or disk replacement to ensure the integrity and reliability of the stored data.

A physical storage device, such as a hard disk drive (HDD), a solid state drive (SSD), a hybrid drive (that combines features of the HDD and the SSD), or a network attached storage (NAS) drive can support multiple storage units. The HDDs use magnetic storage to read and write data onto spinning platters. The SSDs utilize flash memory to provide data access speeds, enhanced durability, and lower power consumption. The hybrid drives combine features of both HDDs and SSDs, e.g., the hybrid drive can include one or more of the HDDs and one or more of the SSDs to provide a balance between storage capacity and improved performance. The NAS systems include HDDs or SSDs using them as storage mediums; RAM and processors, e.g., CPU; and network interfaces, e.g., Ethernet ports, to connect the NAS to local area networks (LANs) or wide area networks (WANs).

The storage unit in the HDD can refer, for example, to a disk that can be independent. Each independent disk (or storage device) may include a plurality of stripes. A stripe is a unit of data or a data segment to be stored on an individual disk. The plurality of stripes are a plurality of data segments, e.g., the stripe can be stored across multiple disks. The data segments or strips that can include the separate data storage units into which data is stripped or divided and distributed across multiple disks of the RAID system. The stripes can be distributed across multiple disks in a systematic manner. By spreading the data segments across multiple drives, the RAID system allows for parallel data retrieval and storage, resulting in faster read and write speeds.

Each strip can include a plurality of data storage units, such as blocks. The block or a logical block address (LBA) can refer to the smallest unit in a filesystem. In some embodiments, the LBA (which can have a size of, for example, 4K) can be the smallest unit of data stored on the device.

The storage unit in the SDD can refer, for example, to a memory cell that can be, for example, semiconductor-based. The memory cells can be arranged in an organized grid, forming data organization and manipulation of data in SSDs. The data can be partitioned into the data segments, which can be distributed across the SSDs in the array. Each segment can include a plurality of data storage units, such as pages.

A controller or a processor having executable instructions, such as in firmware, hardware, or software can scan the error bitmap and start issuing rebuild requests to recover the bad blocks that include the media errors. For example, when RAID-5 is created using three drives having a 64K strip size, a host can issue read requests for the first sixteen LBAs. As a result, the media errors identified in the hard drives are reported to a controller (which can be, for example, a RAID controller). The backend local message index (BKMID) is an index that is assigned to a disk block written to the RAID array. For example, the BKMID can be used to send the I/Os to the disk. Upon I/O completion, the I/O status can be obtained from the BKMID. When the BKMID is issued to perform a read operation and the drive fails to retrieve the data because a media error is present on a block, the drive reports the media error using sense data. The sense data can provide additional error information for storage devices according to the SCSI and Advanced Technology Attachment (ATA) standards. The sense data can contain key-value pairs that provide details on error types, locations, recovery options, etc. When the BKMID failure occurs, the RAID controller can identify the error information by referring to the error status and the sense data available in the BKMID. The RAID controller can report the error back to the RAID system.

The firmware of the RAID controller records the bad LBA in the error bitmap and submits a rebuild request using a parity RAID request format (PRRQ) frame for parity volumes to the RAID controller to recover the data for each bad block. The parity volume can refer to a logical disk that includes parity blocks and that is used to provide redundancy and fault tolerance. Typically, for the first error LBA (or block), e.g., having an offset of 1, the PRRQ request frame will be filled with "OffsetInRow" as 1 and "NumberOfBlocks" as 1. The PRRQ request is submitted to the RAID controller to perform the rebuild of the first error LBA.

The rebuild request is typically sent to recover one bad block. When the RAID controller rebuilds the data, a command indicating a completion of the PRRQ request is sent back to the firmware of the RAID controller. The firmware of the controller can update the frame with "OffsetInRow" that is set to the next bad block, e.g., block 2, and issue a new rebuild request (PRRQ) to the RAID controller. This process continues until all identified bad blocks having the media errors are recovered. Typically, the number of media errors detected on the drive equals the number of rebuild requests issued to recover the bad block data.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, the method may include identifying, by one or more processors, a presence of an error in a plurality of data storage units in a range of data storage units of an error bitmap of a redundant array of independent disks (RAID). The method may also include generating, by the one or more processors, a parity RAID request format (PRRQ) frame, where the PRRQ frame identifying the range of data storage units, where at least one data storage unit has an error, and where the range of data storage units can be identified at least in the plurality of data storage units. The method may furthermore include communicating, by the one or more processors, the PRRQ frame to a controller, where the controller is configured, responsive to the PRRQ frame, to recover the data in the range of data storage units in the plurality of data storage units. Other embodiments of this aspect include corresponding computer systems, apparatus, and computer programs recorded on one or more computer storage devices, each configured to perform the actions of the methods.

Implementations may include the method where the controller can be configured, responsive to not more than one PRRQ frame, to recover the data in the range of the plurality of data storage units. Implementations of the method may include generating, by the one or more processors, the PRRQ frame to include a first field identifying an offset for identifying a location of a first data storage unit of the plurality of data storage units in the range of data storage units and a second field identifying a number of data storage units in the range of data storage units. Implementations may include the method where the range of data storage units is in a data segment on a storage device of the RAID. Implementations may include the method where the error is absent in at least one data storage unit within the range of data storage units. Implementations may include the method where the error is absent in two or more non-subsequent first data storage units within the range of data storage units between the two or more non-subsequent second data storage units. Implementations may include the method where the error bitmap of the plurality of data storage units may identify a cluster of errors on a single storage device of the RAID. Implementations may include the method where the error is a media error. Implementations of the described techniques may include hardware, a method or process, or a computer tangible medium.

In one general aspect, a circuitry may include one or more processors configured to identify a presence of an error in a plurality of data storage units in a range of data storage units of an error bitmap of a redundant array of independent disks (RAID). Implementations may include the one or more processors configured to generate a parity RAID request format (PRRQ) frame, where the PRRQ frame can identify the range of data storage units, where at least one data storage unit has an error, and where the range of data storage units can be identified at least in the plurality of data storage units. Implementations may include the one or more processors configured to communicate the PRRQ frame to a controller, where the controller is configured, responsive to the PRRQ frame, to recover the data in the range of data storage units in the plurality of data storage units. Other embodiments of this aspect include corresponding computer systems, apparatus, and computer programs recorded on one or more computer storage devices, each configured to perform the actions of the methods.

Implementations may include the circuitry where the controller is configured, responsive to not more than one PRRQ frame, to recover the data in the range of the plurality of data storage units. Implementations may include the circuitry where the one or more processors are further configured to generate the PRRQ frame to include a first field identifying an offset for identifying a location of a first data storage unit of the plurality of data storage units in the range of data storage units and a second field identifying a number of data storage units in the range of data storage units. Implementations may include the circuitry where the range of data storage units is in a data segment on a storage device of the RAID. Implementations may include the circuitry where the error is absent in at least one data storage unit within the range of data storage units. Implementations may include the circuitry where the error is absent in two or more non-subsequent first data storage units within the range of data storage units between the two or more non-subsequent second data storage units. Implementations may include the circuitry where the error bitmap of the plurality of data storage units may identify a cluster of errors on a single storage device of the RAID. Implementations of the described techniques may include hardware, a method or process, or a computer tangible medium.

In one general aspect, a system may include one or more processors configured to identify a presence of an error in a plurality of data storage units in a range of data storage units of an error bitmap of a redundant array of independent disks (RAID). The one or more processors may be configured to generate a parity RAID request format (PRRQ) frame, where the PRRQ frame can identify the range of data storage units, where at least one data storage unit has an error, and where the range of data storage units can be identified at least in the plurality of data storage units. The one or more processors may be configured to communicate the PRRQ frame to a controller, where the controller is configured, responsive to the PRRQ frame, to recover the data in the range of data storage units in the plurality of data storage units. Other embodiments of this aspect include corresponding computer systems, apparatus, and computer programs recorded on one or more computer storage devices, each configured to perform the actions of the system.

Implementations may include the system where the controller is configured, responsive to not more than one PRRQ frame, to recover the data in the range of the plurality of data storage units. Implementations may include the system where the one or more processors are further configured to generate the PRRQ frame to include a first field identifying an offset for identifying a location of a first data storage unit of the plurality of data storage units in the range of data storage units and a second field identifying a number of data storage units in the range of data storage units. Implementations may include the system where the range of data storage units is in a data segment on a storage device of the RAID. Implementations may include the system where the error is absent in at least one data storage unit within the range of data storage units. Implementations may include the system where the error is absent in two different sets of data storage units within the range of data storage units. Implementations may include the system where the error bitmap of the plurality of data storage units identifies a cluster of errors on a single storage device of the RAID. Implementations may include the system where the error is a media error. Implementations of the described techniques may include hardware, a method or process, or a computer tangible medium.

BRIEF DESCRIPTION OF THE DRAWINGS

The present disclosure is described in conjunction with the appended figures, which are not necessarily drawn to scale:

FIG. 3 is a flow diagram depicting a method of data recovery in accordance with at least some embodiments of the present disclosure;

FIG. 5 is a block diagram depicting details of one drive having media errors in accordance with at least some embodiments of the present disclosure;

FIG. 6 is a block diagram depicting details of one drive having a cluster of media errors in accordance with at least some embodiments of the present disclosure;

FIG. 7 is a block diagram depicting details of two drives having media errors in accordance with at least some embodiments of the present disclosure;

DETAILED DESCRIPTION

Figure 1:
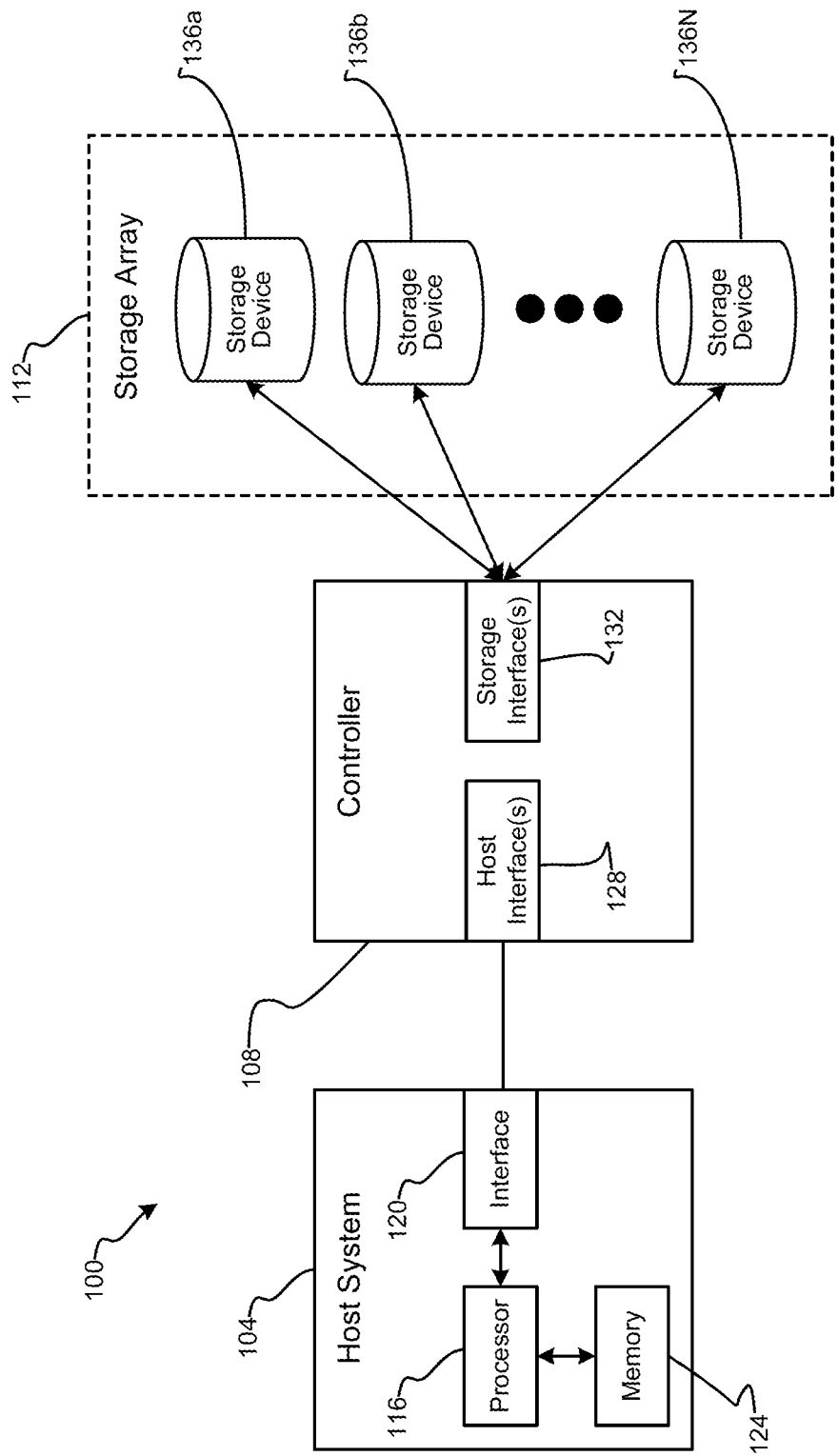
FIG. 1 is a block diagram depicting a computing system in accordance with at least some embodiments of the present disclosure.

Typically, RAID architectures provide mechanisms to detect, mitigate, and recover from media errors. For example, in error detection, the RAID systems typically utilize techniques such as checksums or parity information to detect errors within data blocks. When a cluster of media errors is encountered, the error detection mechanism will identify the corrupted sectors by comparing the calculated checksum or parity against the expected value.

To mitigate the impact of media errors, the RAID systems can employ various levels of redundancy, such as RAID 1 (mirroring redundancy), RAID 5, or RAID 6 (parity-based redundancy). Redundancy can involve storing multiple copies of data and distributing parity information across different drives. When the cluster of media errors is encountered, redundancy allows the RAID system to reconstruct the corrupted data using the redundant information. When the RAID system identifies the affected sectors within the cluster, it can initiate a recovery process. This process typically involves reconstructing the lost or corrupted data using the redundant information available within the RAID array. The recovery process can vary depending on the RAID level employed and the specific algorithms and techniques used by the RAID controller.

In some embodiments, the RAID system may have three arms: Arm 0, Arm 1, and parity information drive (FIG. 5). In some embodiments, in RAID 3, RAID 4, and RAID 5, parity information can be distributed across all data drives in the RAID array. In some embodiments, the parity information can be stored on one drive where, for example, a parity checksum of all block data is written. Parity can be used for detecting errors in a storage system. In some embodiments, at least some stripes of parity information on the drive can contain a parity block that stores the XOR (exclusive OR) value of the corresponding blocks from the other drives, e.g., Arm 0 and Arm 1. For example, adding checksums into data that can detect errors during data transmission can be used. For example, adding a single bit of data to the end of a data block can ensure that the number of bits in the block is even or odd. In the example shown in FIG. 5, blocks 1, 2, 3, and 5 through 11 in Arm 0 have a media error (e.g., blocks 1, 2, 3, and 5 through 11 are bad blocks in Arm 0). None of the blocks in Arm 1 have media errors, therefore the bad blocks 1, 2, 3, and 5 through 11 in Arm 0 can be recovered from good blocks in Arm 1. Typically, for ten recoverable bad blocks within the strip (e.g., blocks 1, 2, 3, and blocks 5 through 11 in Arm 0), ten rebuild request are issued to recover the ten bad blocks. Each PRRQ rebuild request sent by the RAID controller can generate backend I/Os (BKIOs) to read from other arms, for example Arm 1, and perform XOR operation to recover data in Arm 0.

Typically, the recovery process locks a region of blocks, leading to delays in I/O operations that involve the same row of blocks. As a result, the host I/Os experience longer delays, possibly leading to resource starvation or prolonged waiting times.

When a firmware of the RAID controller spends more time for media error recovery processing, other firmware operations can be negatively affected. A recovery time proportionally increases as the number of media errors detected on the drive(s) increases. When a cluster of media errors is encountered on the drives, recovery time can significantly affect overall performance of the RAID controller. For example, the error bitmap can identify the cluster of media errors on the drives simultaneously or within a short timeframe. The cluster of media errors can refer to multiple consecutive or closely located sectors on a drive. As illustrated, for example, in FIG. 6, a cluster of blocks 1 through 11 has media errors. This cluster of errors can occur due to various factors, such as physical damage to the disk surface, manufacturing defects, wear and tear from usage, degradation over time, or environmental conditions. The cluster of media errors can have a significant impact on data integrity and RAID array performance.

With reference to FIG. 1, details of a computing system 100 capable of implementing data recovery will be described in accordance with at least some embodiments of the present disclosure. The computing system 100 is shown to include a host system 104, a controller 108 (e.g., a SCSI controller, a SAS controller, a RAID controller, etc.), and a storage array 112 having a plurality of storage devices (or disk drives) 136a-N therein. Each disk drive 136a-N can have one or more arms. An arm is a device used to form a RAID array. An arm can be a storage device such as a hard disk drive or solid state drive that is configured together with other arms to provide data redundancy and improved performance. In a RAID array, data can be distributed in multiple arms. If one arm fails, the data can still be accessed from the remaining arms. Different RAID levels provide different combinations of redundancy and performance. The storage array 112 may include any or all of the components and perform any or all of the functions of the computer system 800 described in connection with FIGS. 8A and 8B. The system 100 may utilize any type of data storage architecture. The particular architecture depicted and described herein (e.g., a RAID architecture) should not be construed as limiting embodiments of the present disclosure. If the system is implemented using a RAID architecture, however, it should be appreciated that any type of RAID scheme may be employed (e.g., RAID-0, RAID-1, RAID-2, . . . , RAID-5, RAID-6, etc.).

In a RAID-0 (also referred to as a RAID level 0) scheme, data blocks are stored in order across one or more of the storage devices 136a-N without redundancy. This effectively means that none of the data blocks are copies of another data block, and there is no parity block to recover from failure of a storage device 136. A RAID-1 (also referred to as a RAID level 1) scheme, on the other hand, uses one or more of the storage devices 136a-N to store a data block and an equal number of additional mirror devices for storing copies of a stored data block. Higher level RAID schemes can further divide the data into bits, bytes, or blocks for storage across multiple storage devices 136a-N. One or more of the storage devices 136a-N may also be used to store error correction or parity information.

A single unit of storage can be spread across multiple devices 136a-N, and such a unit of storage may be referred to as a stripe. A stripe may include the related data written to multiple devices 136a-N as well as the parity information written to a parity storage device 136a-N. In a RAID-5 (also referred to as a RAID level 5) scheme, the data being stored is divided into blocks for storage across multiple devices 136a-N with a single parity block for each stripe distributed in a particular configuration across the multiple devices 136a-N. This scheme can be compared to a RAID-6 (also referred to as a RAID level 6) scheme in which dual parity blocks are determined for a stripe and are distributed across each of the multiple devices 136a-N in the array 112.

A controller in a RAID system can refer to a hardware device or software program, or combination thereof, that can manage drives such as, for example, hard disk drives (HDDs) or solid-state drives (SSDs), arranged in a storage array in such a manner that the drives operate as a logical unit. RAID controllers can be located between the operating system and the storage drives. The RAID controllers can be hardware-based or software-based. Hardware RAID controllers can be separate physical cards that are installed in the server or computer motherboard expansion slots. The hardware RAID controllers can include a processor and memory, offloading RAID-related tasks from the main system CPU. Software RAID controllers use the server main CPU and are managed through the operating system without requiring a separate card.

For example, one of the functions of the controller 108 is to make the multiple storage devices 136a-N in the array 112 appear to a host system 104 as a single high or higher capacity disk drive than any of the individual storage devices. Thus, the controller 108 may be configured to automatically distribute data supplied from the host system 104 across the multiple storage devices 136a-N (potentially with parity information) without ever exposing the manner in which the data is actually distributed to the host system 104.

In the depicted embodiment, the host system 104 is shown to include a processor 116, an interface 120, and memory 124. It should be appreciated that the host system 104 may omit some of the listed components or include additional components without departing from the scope of the present disclosure. The host system 104 may include any or all of the components and perform any or all of the functions of the computer system 800 described in connection with FIGS. 8A and 8B. The host system 104, in some embodiments, corresponds to a user computer, laptop, workstation, server, collection of servers, or the like. Thus, the host system 104 may or may not be designed to receive input directly from a human user.

The processor 116 of the host system 104 may include a microprocessor, central processing unit (CPU), collection of microprocessors, or the like. The memory 124 may be designed to store instructions that enable functionality of the host system 104 when executed by the processor 116. The memory 124 may also store data that is eventually written by the host system 104 to the storage array 112. The memory 124 may further be used to store data that is retrieved from the storage array 112. The memory 124 devices may include, without limitation, volatile or non-volatile computer memory (e.g., flash memory, RAM, DRAM, ROM, EEPROM, etc.).

The interface 120 of the host system 104 enables the host system 104 to communicate with the controller 108 via a host interface 128 of the controller 108. In some embodiments, the interface 120 and host interface(s) 128 may be of a same or similar type (e.g., utilize a common protocol, a common communication medium, etc.) such that commands issued by the host system 104 are receivable at the controller 108 and data retrieved by the controller 108 is transmittable back to the host system 104. The interfaces 120, 128 may correspond to parallel or serial computer interfaces that utilize wired or wireless communication channels. The interfaces 120, 128 may include hardware that enables such wired or wireless communications. The communication protocol used between the host system 104 and the controller 108 may correspond to any type of known host or memory control protocol. Non-limiting examples of protocols that may be used between interfaces 120, 128 include SAS, SATA, SCSI, FibreChannel (FC), iSCSI, ATA over Ethernet, InfiniBand, or the like.

The controller 108 may provide the ability to represent the entire storage array 112 to the host system 104 as a single high volume data storage device. Any known mechanism can be used to accomplish this task. The controller 108 may help to manage the storage devices 136a-N (which can be hard disk drives, solid-state drives, or combinations thereof) so as to operate as a logical unit. In some embodiments, the controller 108 may be physically incorporated into the host device 104 as a Peripheral Component Interconnect (PCI) expansion (e.g., PCI express (PCI-e)) card or the like. In such situations, the controller 108 may be referred to as a RAID adapter.

The storage devices 136a-N in the storage array 112 may be of similar types or may be of different types without departing from the scope of the present disclosure. The storage devices 136a-N may be co-located with one another or may be physically located in different geographical locations. The nature of the storage interface 132 may depend upon the types of storage devices 136a-N used in the storage array 112 and the desired capabilities of the array 112. The storage interface 132 may correspond to a virtual interface or an actual interface. As with the other interfaces described herein, the storage interface 132 may include serial or parallel interface technologies. Examples of the storage interface 132 include, without limitation, SAS, SATA, SCSI, FC, iSCSI, ATA over Ethernet, InfiniBand, or the like.

Figure 2:
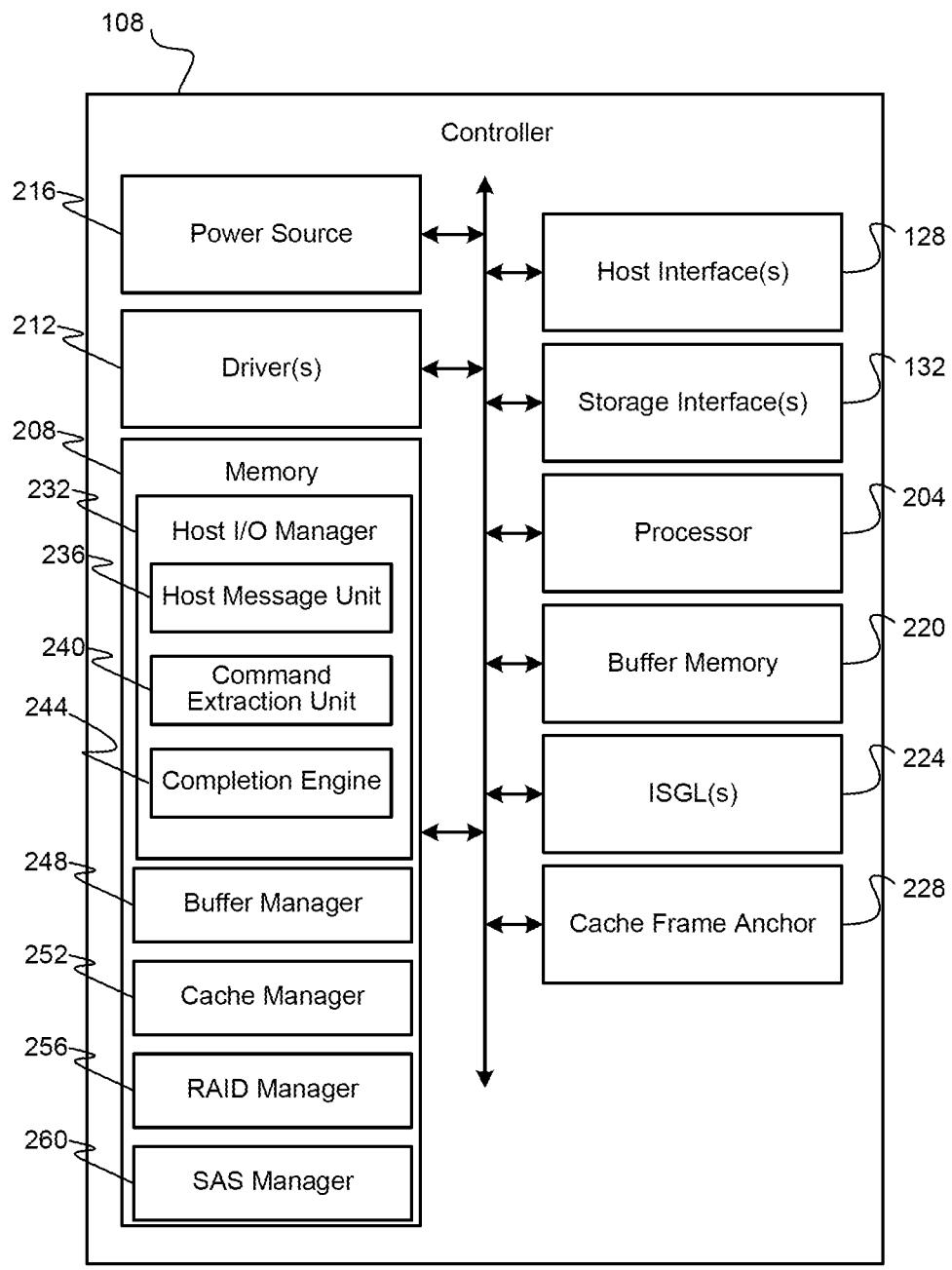
FIG. 2 is a block diagram depicting details of a controller in accordance with at least some embodiments of the present disclosure.

With reference now to FIG. 2, additional details of a controller 108 will be described in accordance with at least some embodiments of the present disclosure. The controller 108 may include any or all of the components and perform any or all of the functions of the computer system 800 described in connection with FIGS. 8A and 8B. The controller 108 is shown to include the host interface(s) 128 and storage interface(s) 132. The controller 108 is also shown to include a processor 204, memory 208 (e.g., a main controller memory), one or more drivers 212, and a power source 216. The controller 108 (for example, the RAID controller) receives an error notification from one of the disk drives in the RAID array, indicating a media error. The controller 108 communicates with the host system through the host interface(s) 128, relaying the error notification and initiating the recovery process. The controller 108 accesses the individual disk drives in the RAID array through the storage interface(s) 132 to retrieve and reconstruct the data.

The processor 204 of the controller 108 executes instructions and performs calculations required for data recovery. The processor 204 may include an Integrated Circuit (IC) chip or multiple IC chips, a CPU, a microprocessor, or the like. The controller 108 utilizes memory 208 to store data, instructions, and intermediate results during the recovery process, facilitating efficient data manipulation and reconstruction. The processor 204 may be configured to execute instructions in memory 208 that are shown to include a host I/O manager 232, a buffer manager 248, a cache manager 252, a RAID manager 256, and a SAS manager 260. Furthermore, in connection with performing caching or buffer functions, the processor 204 may utilize buffer memory 220, one or more Internal Scatter Gather Lists (ISGLs) 224, and a cache frame anchor 228. The host I/O manager 232 is shown to include a plurality of sub-routines that include, without limitation, a host message unit 236, a command extraction unit 240, and a completion engine 244. An Internal Scatter Gather List (ISGL) 224 refers to a data structure used for efficient data transfer between devices, such as in storage systems or network interfaces.

Each of the components (e.g., the host I/O manager 232, the buffer manager 248, the cache manager 252, the RAID manager 256, and the SAS manager 260) may correspond to different functional blocks that operate in their own local memory, loading the global memory (e.g., a global buffer memory 220 or memory 208) on an as-needed basis. Each of these different functional blocks can be accelerated by different hardware threads without departing from the scope of the present disclosure.

The memory 208 may be volatile and non-volatile in nature. As indicated above, the memory 208 may include any hardware component or collection of hardware components that are capable of storing instructions and communicating those instructions to the processor 204 for execution. Non-limiting examples of memory 208 include RAM, ROM, flash memory, EEPROM, variants thereof, combinations thereof, and the like. Similarly, the buffer memory 220 may be volatile or non-volatile in nature. The buffer memory 220 may be configured for multiple read and writes and may be adapted for quick access by the processor 204. The controller 108 utilizes buffer memory 220 to temporarily store data during the recovery process, ensuring efficient read and write operations. The controller 108 interacts with the ISGL 224, which provides efficient data storage and retrieval capabilities, facilitating the recovery process. Within the cache memory, the controller 108 uses a cache frame anchor 228 as a reference point for storing and retrieving data during the recovery process.

The instructions stored in the memory 208 are shown to be different instruction sets, but it should be appreciated that the instructions can be combined into a smaller number of instruction sets without departing from the scope of the present disclosure. The host I/O manager 232, when executed, enables the processor 204 to manage I/O commands received from the host system 104 and facilitates higher-level communications with the host system 104. In some embodiments, the host I/O manager 232 may utilize the host message unit 236 to process incoming messages received from the host system 104. As a non-limiting example, the controller 108 may receive messages from the host system 104 in an NPI protocol. The host message unit 236 may bring down the messages received from the host system 104 and pass the content of the messages to the command extraction unit 240. The command extraction unit 240 may be configured to determine if a particular command in a message is accelerable (e.g., capable of being passed to a particular functional block to facilitate hardware acceleration). If a command is determined to be accelerable, then the command extraction unit 240 may implement a hardware acceleration process and generate an appropriate Local Message ID (LMID) that represents all of the information received from the host system 104 (in the command). The LMID effectively represents the command received from the host system 104 but is in a different format that is understandable by the managers 248, 252, 256, 260. The command extraction unit 240 may, in some embodiments, route the various commands (e.g., LMIDs) to one or more of the buffer manager 248, the cache manager 252, the RAID manager 256, and the SAS manager 260. The routing of the commands may depend upon a type of the command and the function to be executed. The completion engine of the host I/O manager 232 may be responsible for reporting to the host system 104 that an I/O command has been completed by the controller 108.

The RAID manager 256 and SAS manager 260 may include instructions that, when executed, enable the processor 204 to communicate with the storage array 112 of storage devices 136 therein. In some embodiments, the RAID manager 256 and the SAS manager 260 may receive commands either directly from the host I/O manager 232 (if no caching was needed) or they may receive commands from the cache manager 252 after an appropriate caching process has been performed. When invoked, the RAID manager 256 and the SAS manager 260 may enable the processor 204 to finalize read or write commands and exchange data with the storage array 112.

The host I/O manager 232 oversees I/O operations between the host system 104 and the controller 108, ensuring proper data transfer and command handling. Incoming messages or commands from the host system are received by the host message unit 236, which relays them to the appropriate components within the controller 108. The command extraction unit 240 of the controller 108 extracts relevant commands from incoming messages, preparing them for execution. Upon executing commands, the completion engine 244 manages their completion and sends the corresponding responses back to the host system 104 (FIG. 1), providing status updates. The buffer manager 248 of the controller 108 allocates and manages a buffer memory 220 to store data during read and write operations, ensuring efficient data handling. The cache manager 252 oversees the management and utilization of cache memory, including data caching, eviction policies, and cache coherence, to optimize data access during recovery. The RAID manager 256 oversees the overall management and operation of the RAID system 100, including error recovery and data reconstruction. The SAS manager 260 handles the Serial Attached SCSI (SAS) protocol, facilitating communication between the controller 108 and the disk drives during the recovery process. Other protocols can include Serial ATA (SATA), Non-Volatile Memory Express (NVMe), Fibre Channel (FC), Internet Small Computer System Interface (iSCSI), InfiniBand, Fibre Channel over Ethernet (FCOE), Parallel Advanced Technology Attachment (PATA) and the like.

Software drivers 212 facilitate communication between the controller 108 and the host system operating system, enabling data transfer and command execution. The driver(s) 212 may comprise firmware, hardware, software, or combinations thereof that enable the processor 204 to make use of other hardware components in the controller 108. For instance, different drivers 212 may be provided to support functions of the interfaces 128, 132. As another example, separate drivers 212 may be provided to support functions of the buffer memory 220. The drivers 212 may perform the low-level routines that allow the processor 204 to communicate with the other hardware components and respond to commands received from the processor 204.

The power source 216 supplies electrical power to the controller 108 and the disk drives 136a-N, ensuring their operation during the recovery process. The power source 216 may include hardware components that provide the controller 108 with the power necessary to run the processor 204 and other components. As an example, the power source 216 may correspond to a power converter that receives AC power from an external source (e.g., a power outlet) and converts the AC power into DC power that is useable by the other hardware components of the controller 108. In some embodiments, the power source 216 may correspond to an internal power source (e.g., a battery pack, bank of capacitors, etc.) that provides power to the hardware components of the controller 108.

With reference to FIG. 3, additional details of a data structure 300 will be described in accordance with at least some embodiments of the present disclosure. The data structure 300 may be used to recover data in bad blocks. Although FIG. 3 shows the data structure 300 as having a particular layout or organizational structure, it should be appreciated that the data structure 300 may be configured in any number of ways without departing from the scope of the present disclosure. The data structure 300 may correspond to a data structure that is created and managed by one of the components in memory 208.

The various sections of the data structure 300 may be used to store data that enables the controller 208 to utilize variable stripe sizes, thereby taking advantage of different workloads (where different types of commands require different amounts of memory and processing capabilities).

The data structure 300 is shown to include a function identification field, an operational code field (opcode), hardware (HW) context, device handle, a parent LMID field and a next LMID field, a flag field and a message flag field, a next LMID identification field, a counter or coefficients index field, an Internal Scatter Gather List (ISGL) skip count or offset field (offset in row), a span field, a RowMod field, a strip or row number field, a second strip or row number field, a number of blocks to recover field, a lead ISGL or extension LMID field, and a control flags field. In some embodiments, the data structure 300 can include an MSI index field, a Logical Drive (LD) number field, a VF_ID field, an MPI flags field, a reserve field, an arm field, an offset in arm field, a data HSGL or RSGL ID field, a primary reference tag field, a primary application tag mask, a primary application tag field, an extension flags field, an extension ID field, and a buffers descriptor field (not shown). Some or all of these fields may be used in connection with performing a recovery process, determining where to begin the recovery process, determining where to end the recovery process, etc. The data structure 300 is specifically useful to enable certain managers (e.g., the cache manager 252 and the buffer manager 248) to communicate with one another and coordinate their efforts with respect to performing a recovery process.

The strip or stripe number field may store data that identifies the strip or stripe for which the data structure 300 is being used. In some embodiments, the strip or stripe field may uniquely identify a strip or stripe. In some embodiments, the strip or stripe field may identify a memory location (e.g., a starting location) of a strip or stripe of data stored in a storage device 136. For instance, the strip or stripe field may store a number that has been assigned to a particular strip or stripe of data.

The flag fields (flags and message flags) may store information describing a memory location of a flag or an identifier of a flag associated with the data structure 300. Various types of flags may be used to identify a type of data stored in connection with the data structure 300, and the flag extension field may be used to identify that type of data.

The LD ID field may contain an identifier or multiple identifiers of logical disks used to store the data. The logical disk may be identified by a memory location or by some alias used in a naming scheme for the logical disks being managed by the controller 108.

The Span field may store a value describing a number of data blocks spanned by a particular set of data. The extent ID field may store information uniquely identifying an extent frame from among other extent frames.

Local Message ID (LMID) can refer to a unique identifier assigned to individual messages within a system. The LMID serves as a means of identifying and tracking messages as they traverse through the system, allowing for efficient message routing, processing, and synchronization. If errors or failures occur during message transmission or processing, the Local Message ID can be utilized for error detection, recovery, and resynchronization. By referencing the Local Message ID, components of the controller 108 can identify and handle messages that have encountered errors or require retransmission. The parent LMID refers to the identifier of the RAID array or logical unit where the media error occurred, serving as a reference for the recovery process. In a RAID system with multiple logical units or arrays, the next LMID represents the identifier of the logical unit. The data structure 300 may correspond to an LMID used to communicate data between the various managers or modules of the controller 108. LMID can refer to a Local Message ID, e.g., a unique identifier assigned to individual messages within a communication system. In some embodiments, the LMID may correspond to a recovery LMID that is used to facilitate a hardware-based recovery process or routine.

The RAID controller 108 utilizes opcodes, representing specific operations or commands, to initiate and coordinate the recovery process, instructing the involved components accordingly. Various flags are associated with components or operations within the system 100 to provide specific attributes or properties, guiding the recovery process. The message flags associated with the error notification and recovery commands provide specific attributes or properties related to the error and subsequent operations. The hardware context contains information about the current state of the hardware components involved in the recovery process, assisting in decision-making and data manipulation.

Figure 4:
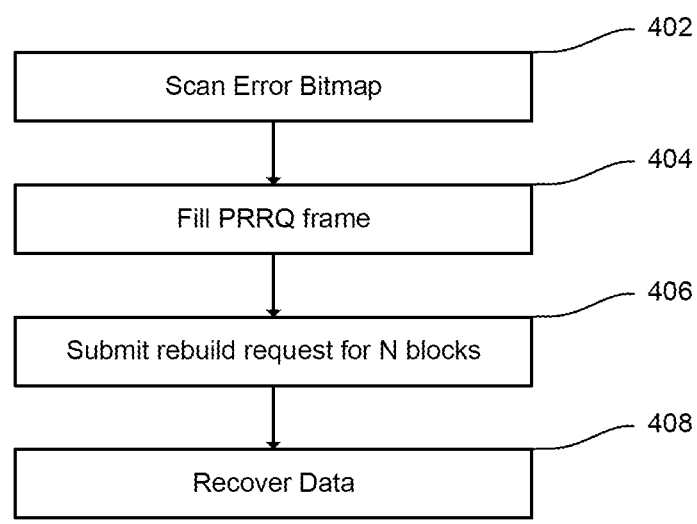
FIG. 4 is a block diagram depicting details of a data structure used in accordance with at least some embodiments of the present disclosure.

FIG. 4 is a flow diagram depicting a method 400 of data recovery in accordance with some embodiments. The method 400 can be executed, performed, or otherwise carried out by the system 100, the computer system 800 described in connection with FIGS. 8A and 8B, or any other computing devices described herein. In brief overview, the method 400 can be implemented to perform a rebuild operation of multiple blocks using a single request. An error bitmap is a data structure that is used to track the status of individual blocks within a range of blocks on the disks 136a-N. The error bitmap can be a bitmap-sized data structure, corresponding to the entire range of blocks on the disks. Each bit in the bitmap represents the status of a corresponding block on the disks. A "1" in the bitmap can indicate that the corresponding block is in an error state, and a "0" can indicate that the block does not have an error. The error bitmap can indicate whether each block is in an error state or not. When a disk 136a-N or a portion of the disk 136a-N becomes faulty, the error bitmap facilitates identifying which specific blocks are affected, and the system 100 can use redundancy to recover the lost data. To identify the presence of an error in a plurality of blocks in a range of blocks within the error bitmap of the RAID array 112, the following operations can be performed: monitoring and reporting, the error bitmap analysis, and identifying affected blocks.

For example, the RAID controller 108 can monitor the condition of the disks 136a-N in the RAID array 112. When an error occurs on one or more disks 136a-N, the error is reported to the RAID management system, e.g., the controller 108. The RAID controller 108 can access and scan the error bitmap to identify the bits that are set to "1", indicating the presence of errors. As the error bitmap represents a range of blocks, a contiguous series of "ones" may point to a faulty section on a specific disk.

At step 402, the method 400 can include scanning the error bitmap. In some embodiments, when the RAID system builds the error bitmap, the firmware of the RAID controller 108 can scan and identify if the identified error blocks are recoverable from other arms. In some embodiments, the disk drive 136a-N detects a media error on one of its arms. The disk drive 136a-N sends an error notification to the RAID controller 108 through the storage interface(s) 132. The RAID manager 256 of the controller 108 receives the error notification from the disk drive 136a-N. The RAID manager 256 analyzes the error and identifies the Parent Logical Multiplier ID (Parent LMID) associated with the disk drive 136a-N that has the media error(s).

At step 404, the method 400 can include filling the PRRQ frame. In some embodiments, the firmware of the RAID controller 108 can identify the range of bad blocks in the strip which can be recoverable. For example, based on the error notification and the parent LMID, the RAID Manager 256 can initiate the recovery process.

At step 406, the method 400 can include submitting rebuild request for a plurality of the blocks. In some embodiments, the firmware of the RAID controller 108 can issue not more than one PRRQ request to rebuild all bad blocks. The RAID manager 256 sends recovery commands to the host message unit 236. The host message unit 236 forwards the recovery commands to the command extraction unit 240. The command extraction unit 240 extracts the recovery commands from the incoming messages. The processor 204 receives the extracted recovery commands from the command extraction unit 240.

At step 408, the method 400 can include recovering the data, according to some embodiments. For example, the processor 204 executes the extracted recovery commands received from the command extraction unit 240. The processor 204 communicates with the individual disk drives 136a-N in the RAID array 112 through the storage interface(s) 132 to retrieve the necessary data for reconstruction of the data. The processor 204 uses the buffer manager 248 to allocate and manage buffer memory for temporary storage during the recovery process. The method begins when the buffer manager 248 receives the allocate buffer(s) command. This command may be received in the form of an LMID or multiple LMIDs.

The processor 204 utilizes the cache manager 252 to handle data caching and eviction policies to optimize data access during recovery. The command (e.g., LMID) may be received at the cache manager 252 from the host I/O manager 232 or the buffer manager 248. The ISGL that was received along with the LMID can be also loaded at this stage of the recovery process. The method 400 can include obtaining the start row and number of blocks from the LMID, as well as the offset in the arm from the LMID. This information is used to calculate the start LBA, the number of rows from the start row that are spanned by the I/O command, the number of extents per strip, an extent index, and the start buffer segment index. In some embodiments, the start strip and the number of blocks is obtained directly from the command LMID. The start LBA is calculated from the first recoverable LBA of the strip. The number of strips needed from the first recoverable LBA is calculated form the number of blocks needed to accommodate the I/O command. The number of extents per strip is calculated by dividing the strip size by the number of buffer segments in an extent. The extent index is calculated by dividing the offset in the first arm by the number of buffer segments in an extent.

The processor 204 uses the retrieved data from the working drives and the parity information (in case of RAID 5 or RAID 6) to reconstruct the data that was lost due to the media error. The processor 204 performs data verification to ensure the accuracy of the reconstructed data. The processor 204 writes the reconstructed data back to the appropriate disk drive in the RAID array through the storage interface(s) 132. The RAID manager 256 verifies the successful writeback and corrects any inconsistencies or errors in the RAID array 112. The RAID manager 256 informs the completion engine 244 about the status of the recovery process and any error corrections made. The completion engine 244 sends the status update back to the host message unit 236. The host message unit 236 relays the status update to the host I/O manager 232. The host I/O manager 232 informs the host system 104 about the completion of the recovery process and the success of the error correction.

FIG. 5 is a block diagram depicting details of a system 500 where one drive has media errors in accordance with at least some embodiments of the present disclosure. In some embodiments, media errors on a single drive can be identified by the controller 108. In some embodiments, the firmware of the controller 108 can create a rebuild request using the PRRQ frame. The PRRQ frame is a data structure used in computer storage systems to facilitate the implementation of parity RAID technology. The parity RAID is a data protection method that enhances the reliability and fault tolerance of storage devices by distributing data across multiple disks along with parity information. The PRRQ frame is typically utilized within a storage protocol designed to coordinate and manage the RAID operations, such as Small Computer System Interface (SCSI) and Serial ATA (SATA). Other protocols can include Non-Volatile Memory Express (NVMe), Fibre Channel (FC), Internet Small Computer System Interface (iSCSI), InfiniBand, Fibre Channel over Ethernet (FCOE), Parallel Advanced Technology Attachment (PATA) and the like. The PRRQ frame serves as a standardized format for issuing the RAID-specific requests to the RAID controller or the RAID array.

The PRRQ frame can include information related to RAID operations, including but not limited to the following: the type of a RAID operation requested, such as read, write, rebuild, or parity calculation; the RAID Level; source and destination addresses; data payload (the actual data to be written or read from the RAID array); and parity information used for RAID calculations (e.g., for RAID 5 and RAID 6). The PRRQ frame can enable communication between the host system and the RAID controller or the RAID array, facilitating the RAID functionality to be efficiently managed and coordinated. When the host system needs to perform a RAID operation, it constructs a PRRQ frame with the parameters and sends it to the RAID controller through the appropriate storage protocol. The RAID controller interprets the PRRQ frame, executes the requested RAID operation, and may return relevant information to the host system, such as the result of the operation or status updates.

In some embodiments, the PRRQ frame can have the following parameters: OffsetInRow and NumberOfBlocks. For example, in the case illustrated in FIG. 5, the "OffsetInRow" field can be set to 1 (e.g., the first bad block, which is block 1). A number of blocks can be set to a summation of 1 and the difference between the last bad block (e.g., block 11) and the first bad block (e.g., block 1). Therefore, the "NumberOfBlocks" to be rebuilt can be set to eleven blocks (e.g., 1+11-1). In some embodiments, the firmware of the controller 108 can issue not more than one PRRQ request to rebuild all bad blocks 1 through 3 and blocks 5 through 11. As illustrated in FIG. 5, block 4 does not have the media error but it can be rebuilt with not more than one PRRQ request along with the bad blocks 1 through 3 and blocks 5 through 11. A user can save time by using not more than one PRRQ request instead of using two separate PRRQ requests: a first PRRQ request for rebuilding the bad blocks 1 through 3 and a second PRRQ request for rebuilding the bad blocks 5 through 11.

In some embodiments, the error may be absent in two or more non-subsequent blocks within the range of blocks between the two or more non-subsequent blocks. For example, in Arm 0, the error can be absent in the two non-subsequent blocks 4 and 8 (not shown in FIG. 5) that are positioned at least between two non-subsequent blocks 0 and 12. The PRRQ frame can have the following parameters: OffsetInRow and NumberOfBlocks. The "OffsetInRow" field can be set to 1 (e.g., the first bad block, which is block 1). A number of blocks can be set to a summation of 1 and the difference between the last bad block (e.g., block 11) and the first bad block (e.g., block 1). Therefore, the "NumberOfBlocks" to be rebuilt can be set to eleven blocks (e.g., 1+11-1). In some embodiments, the firmware of the controller 108 can issue not more than one PRRQ request to rebuild all bad blocks 1 through 3, bad blocks 5 through 7, and bad blocks 9 through 11. The blocks 4 and 8 may not have the media error but they can be rebuilt with not more than one PRRQ request along with the bad blocks 1 through 3, the bad blocks 5 through 7, and the bad blocks 9 through 11. A user can save time by using not more than one PRRQ request instead of using three separate PRRQ requests: a first PRRQ request for rebuilding the bad blocks 1 through 3, a second PRRQ request for rebuilding the bad blocks 5 through 7, and a third PRRQ request for rebuilding the bad blocks 9 through 11.

FIG. 6 is a block diagram depicting details of a system 600 where one drive has a cluster of media errors in accordance with at least some embodiments of the present disclosure. In some embodiments, a cluster of errors on a single drive can be identified by the controller 108. In some embodiments, the firmware of the controller 108 can create a rebuild request using PRRQ frame having the following parameters: OffsetInRow and NumberOfBlocks. For example, the "OffsetInRow" field can be set to 1 (e.g., the first bad block, which is block 1). A number of blocks can be set to a summation of 1 and the difference between the last bad block (e.g., block 11) and the first bad block (e.g., block 1). Therefore, the "NumberOfBlocks" to be rebuilt can be set to eleven blocks (e.g., 1+11-1). In some embodiments, the firmware of the controller 108 can issue not more than one PRRQ request to rebuild all bad blocks 1 through 11. The system 100 described herein can improve the RAID controller media error recovery time because the system 100 allows a user to leverage the hardware support to perform the rebuild operation of multiple blocks in not more than one PRRQ request.

FIG. 7 is a block diagram depicting details of a system 700 where two drives have media errors in accordance with at least some embodiments of the present disclosure. In some embodiments, in addition to more than one arm having media errors, there can be one or more blocks (for example, block 7) that has media errors in all drives that are used to recover information (e.g., Arm 0 and Arm 1). If not all errors are recoverable, the firmware of the controller 108 can split the range of I/Os for recovery and submit the PRRQ frame to rebuild the recoverable blocks.

For example, the firmware of the controller 108 can issue two PRRQ requests using the same PRRQ frame to rebuild all recoverable bad blocks 1 through 6 and 8 through 11. In some embodiments, the firmware of the controller 108 can create a first rebuild request using a PRRQ frame having the following parameters: OffsetInRow and NumberOfBlocks. The "OffsetInRow" field can be set to 1 (e.g., the first bad block, which is block 1). A number of blocks can be set to a summation of 1 and the difference between the last recoverable bad block (e.g., block 6) and the first recoverable bad block (e.g., block 1). Therefore, the "NumberOfBlocks" to be rebuilt with the first rebuild request can be set to six blocks (e.g., 1+6-1).

When the first rebuild is completed, a second rebuild request can be issued using the same PRRQ frame having the following parameters: OffsetInRow and NumberOfBlocks. The "OffsetInRow" field can be set to 8 (e.g., the bad block 8). A number of blocks can be set to a summation of 1 and the difference between the last recoverable bad block (e.g., block 11) and the first recoverable bad block (e.g., block 8). Therefore, the "NumberOfBlocks" to be rebuilt with the second rebuild request can be set to four blocks (e.g., 1+11-8). As a result, two PRRQ request using the same PRRQ frame are used to rebuild all recoverable bad blocks 1 through 6 and 8 through 11.

The system 100 can allow a significant reduction in the number of the rebuild requests submitted to the hardware. Hardware resource usage is reduced due to the smaller number of rebuild requests submitted to the hardware. For example, for a logic drive (LD) having a 256K strip size and one arm having a cluster of ten media errors, only one rebuild request can be issued which can constitute ten percent of the typical number of the rebuild requests submitted to the typical hardware that does not utilize the system 100. In some embodiments, the host I/Os that require recovery can complete rebuilding of the bad blocks at a faster rate. Recovery time can be decreased, and the firmware of the controller 108 can handle more recoveries on a row (or rows) during a given period. In some embodiments, irrespective of the number of the recoverable bad blocks within a strip, only a single rebuild request can be sufficient to recover all recoverable bad blocks. As a result, a significant reduction in the processing time for the firmware of the controller 108 can be achieved, allowing the CPU to perform other operations.

The following IEEE standard(s), including any draft versions of such standard(s), are hereby incorporated herein by reference in their entirety and are made part of the present disclosure for all purposes: IEEE 802.3, IEEE 802.11x, IEEE 802.11ad, IEEE 802.11ah, IEEE 802.11aj, IEEE 802.16 and 802.16a, and IEEE 802.11ac. In addition, although this disclosure may reference aspects of these standard(s), the disclosure is in no way limited by these standard(s).

Figure 8A:
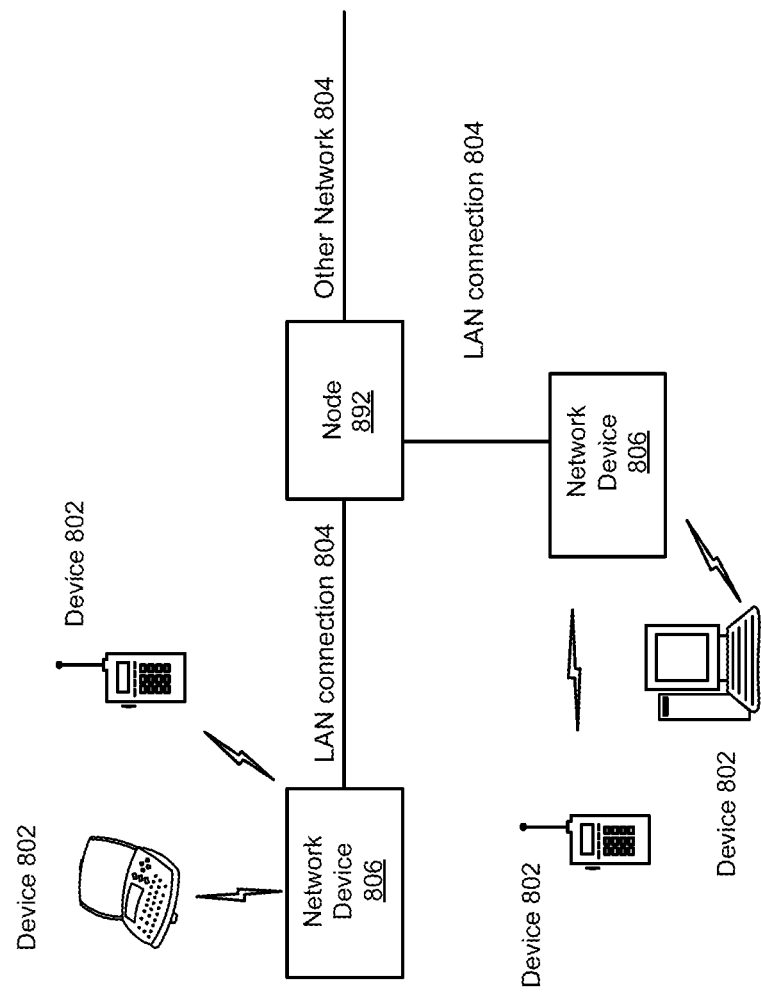
FIG. 8A is a block diagram depicting an embodiment of a computing environment including one or more access points in communication with one or more wireless devices or stations.

Having discussed specific embodiments of the present solution, it may be helpful to describe aspects of the operating environment as well as associated system components (e.g., hardware elements) in connection with the methods and systems described herein. Referring to FIG. 8A, an embodiment of a network environment is depicted. The network may include or be in communication with one or more storage area networks (SANs), security adapters, or Ethernet converged network adapters (CNAs). In brief overview, the network environment includes a communication system that includes one or more network devices 806, one or more client devices 802 and a network hardware component 892. In some embodiments, the network device 806 can be an access point (AP). In some embodiments, the client device 802 can be a wireless communication device. For example, the client devices 802 may include laptop computers 802, tablets 802, personal computers 802, wearable devices 802, vehicles 802 (e.g., automobiles, drones, smart vehicles, robotic units, and the like), video game consoles 802, cellular telephone devices 802, smart TV sets 802, Internet of Thing (IoT) devices 802, and any other electronic devices 802 capable of wireless communication. The details of an embodiment of client devices 802 and network device 806 are described in greater detail with reference to FIGS. 8B and 8C. The network environment can be an ad hoc network environment, an infrastructure wireless network environment, a wired network coupled to a wireless network, a subnet environment, or a combination of the foregoing, in one embodiment.

The network devices 806 may be operably coupled to the network hardware 892 via local area network connections. The network hardware 892, which may include one or more routers, gateways, switches, bridges, modems, system controllers, appliances, and the like, may provide a local area network connection for the communication system. Each of the network devices 806 may have an associated antenna or an antenna array to communicate with the client devices in its area. The client devices may register with a particular network device 806 to receive services from the communication system (e.g., via a SU-MIMO or MU-MIMO configuration). For direct connections (i.e., point-to-point communications), some client devices may communicate directly via an allocated channel and communications protocol. Some of the client devices 802 may be mobile or relatively static with respect to the network device 806.

In some embodiments, a network device 806 includes a device or module (including a combination of hardware and software) that enables the connection of client devices 802 to wired or wireless networks. The network device 806 is oriented towards wired connections and is also designed to support wireless connections. The configuration and design of the network device 806 enables communication of the network device 806 with controllers and storage devices established through wired links. A network device 806 may connect to a router (e.g., via a wired network) as a stand-alone device in some embodiments. In other embodiments, a network device 806 can be a component of a router. A network device 806 can provide multiple devices access to a network. A network device 806 may, for example, connect to a wired Ethernet connection and provide wireless connections using radio frequency links for other devices 802 to utilize that wired connection. A network device 806 may be built and configured to support a standard for sending and receiving data using one or more radio frequencies. Those standards and the frequencies they use may be defined by the IEEE (e.g., IEEE 802.11 standards). A network device 806 may be configured and used to support public Internet hotspots and on an internal network to extend the network's Wi-Fi signal range.

In some embodiments, the network devices 806 may be used for in-home or in-building wireless networks (e.g., IEEE 802.11, Bluetooth, ZigBee, any other type of radio frequency-based network protocol or variations thereof). Each of the client devices 802 may include a built-in radio or be coupled to a radio. Such client devices 802 and network devices 806 may operate in accordance with the various aspects of the disclosure as presented herein to enhance performance, reduce costs or size, and enhance broadband applications. Each client device 802 may have the capacity to function as a client node seeking access to resources (e.g., data, and connection to networked nodes such as servers) via one or more network devices.

The network connections may include any type or form of network and may include any of the following: a point-to-point network, a broadcast network, a telecommunications network, a data communication network, or a computer network. The topology of the network may be a bus, star, or ring network topology. The network may be of any such network topology as known to those ordinarily skilled in the art and capable of supporting the operations described herein. In some embodiments, different types of data may be transmitted via different protocols. In other embodiments, the same types of data may be transmitted via different protocols.

Figure 8B:
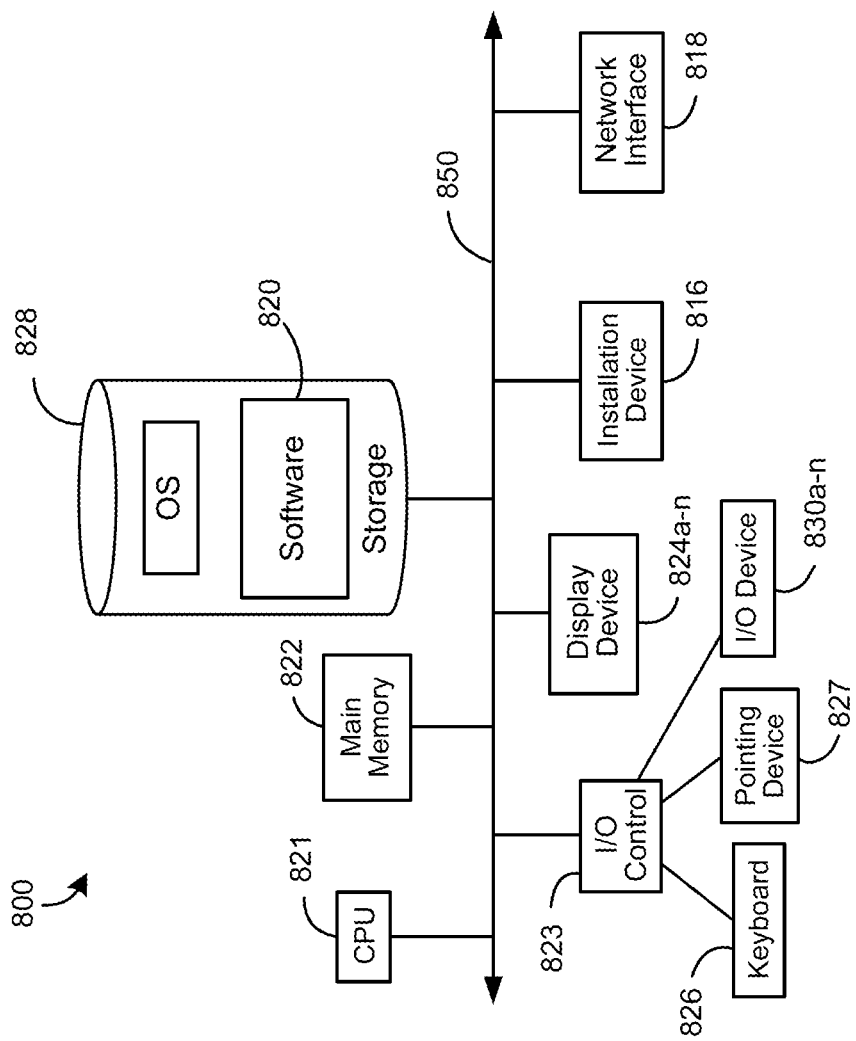
FIGS. 8B and 8C are block diagrams depicting embodiments of computing devices useful in connection with the methods and systems described herein.
Figure 8C:
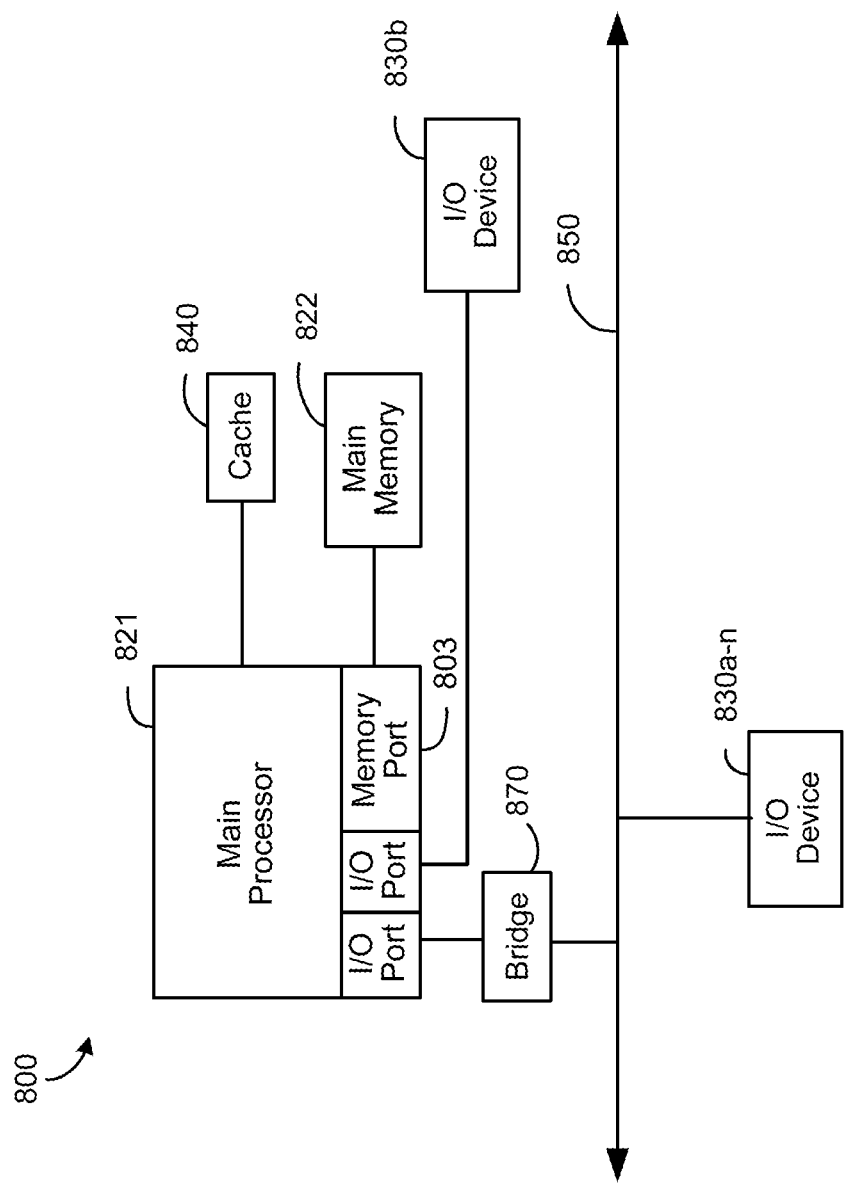

The client device(s) 802 and network device(s) 806 may be deployed as or executed on any type and form of computing device, such as a computer, network device, or appliance capable of communicating on any type and form of network and performing the operations described herein. FIGS. 8B and 8C depict block diagrams of a computing device 800 useful for practicing an embodiment of the client device 802 or network device 806. As shown in FIGS. 8B and 8C, each computing device 800 includes a central processing unit 821, and a main memory or main memory unit 822. As shown in FIG. 8B, a computing device 800 may include a storage device 828, an installation device 816, a network interface 818, an I/O controller 823, display devices 824a-801n, a keyboard 826 and a pointing device 827, such as a mouse. The storage device 828 may include, without limitation, an operating system or software. As shown in FIG. 8C, each computing device 800 may also include additional optional elements, such as a memory port 803, a bridge 870, one or more input/output (I/O) devices 830a-830n (generally referred to using reference numeral 830), and a cache memory 840 in communication with the central processing unit 821.

"Circuitry" can refer to the interconnected arrangement of electronic components and pathways that allow the flow of electrical signals within a device, system, or application. In some embodiments, a single component circuitry can be an electronic component such as a resistor, capacitor, or transistor that performs a certain function within an electronic system. In some embodiments, multiple components working together in circuitry can include coordination of various electronic components. In some embodiments, the circuitry can include hardware components, such as integrated circuits, transistors, resistors, capacitors, and connectors, as well as combinations of hardware and software or firmware elements that can operate together to perform various functions. The multiple components can include separate components such as sensors, microcontrollers, memory modules, communication interfaces, or power management circuits, which are interconnected to form a functional system. For example, the circuitry can include microcontrollers or processors that execute software instructions to control the behavior of the hardware components. For example, the circuitry processors can run programs that enable the device or system to perform various tasks such as data processing and communication. The components may be physically not contained within the same device, for example, the components can be distributed across different devices connected through wired or wireless interfaces.

The central processing unit (CPU) 821 is any logic circuitry that responds to and processes instructions fetched from the main memory unit 822. In many embodiments, the central processing unit 821 is provided by a microprocessor unit, such as those manufactured by Intel Corporation of Mountain View, California; those manufactured by International Business Machines of White Plains, New York; or those manufactured by Advanced Micro Devices of Sunnyvale, California. The computing device 800 may be based on any of these processors or any other processor capable of operating as described herein. The CPU can be a programmable parallel processor.

Other programmable parallel processors can include a graphics processing unit (GPU) and a neural processor. The GPU is a programmable parallel processor that can perform complex computations for graphics rendering and general-purpose computing tasks. The GPU consists of processing cores interconnected through a high-bandwidth memory interface and a bus system, enabling efficient parallel processing. The processing core of the GPU can be equipped with dedicated arithmetic logic units and memory caches, allowing for simultaneous execution of multiple computational threads. To optimize graphics rendering pipelines, the GPU can incorporate the following hardware components: texture units and rasterizers. The GPU can employ optimized algorithms and data parallelism techniques to accelerate computations, resulting in superior performance compared to a conventional CPU. The GPU can be programmable using graphics APIs and parallel computing frameworks, enabling scientific simulations, machine learning, and data analytics.

Main memory unit 822 may be one or more memory chips capable of storing data and allowing any storage location to be accessed by the microprocessor 821, such as any type or variant of Static random-access memory (SRAM), Dynamic random-access memory (DRAM), Ferroelectric RAM (FRAM), NAND Flash, NOR Flash and Solid-State Drives (SSD). The main memory 822 may be based on any of the above-described memory chips, or any other available memory chips capable of operating as described herein. In the embodiment shown in FIG. 8B, the processor 821 communicates with main memory 822 via a system bus 850 (described in more detail below). FIG. 8C depicts an embodiment of a computing device 800 in which the processor communicates directly with main memory 822 via a memory port 803. For example, in FIG. 8C the main memory 822 may be DRAM.

FIG. 8C depicts an embodiment in which the main processor 821 communicates directly with cache memory 840 via a secondary bus, sometimes referred to as a backside bus. In other embodiments, the main processor 821 communicates with cache memory 840 using the system bus 850. Cache memory 840 typically has a faster response time than main memory 822 and is provided by, for example, SRAM, BSRAM, or EDRAM. In the embodiment shown in FIG. 8C, the processor 821 communicates with various I/O devices 830 via a local system bus 850. Various buses may be used to connect the central processing unit 821 to any of the I/O devices 830, for example, a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 824, the processor 821 may use an Advanced Graphics Port (AGP) to communicate with the display 824. FIG. 8C depicts an embodiment of a computer or computer system 800 in which the main processor 821 may communicate directly with I/O device 830b, for example via HYPERTRANSPORT, RAPIDIO, or INFINIBAND communications technology. FIG. 8C also depicts an embodiment in which local busses and direct communication are mixed: the processor 821 communicates with I/O device 830a using a local interconnect bus while communicating with I/O device 830b directly.

A wide variety of I/O devices 830a-830n may be present in the computing device 800. Input devices include keyboards, mice, trackpads, trackballs, microphones, dials, touch pads, touch screen, and drawing tablets. Output devices include video displays, speakers, inkjet printers, laser printers, projectors and dye-sublimation printers. The I/O devices may be controlled by an I/O controller 823 as shown in FIG. 8B. The I/O controller may control one or more I/O devices, such as a keyboard 826 and a pointing device 827, e.g., a mouse or optical pen. Furthermore, an I/O device may also provide storage and an installation medium 816 for the computing device 800. In still other embodiments, the computing device 800 may provide USB connections (not shown) to receive handheld USB storage devices such as the USB Flash Drive line of devices manufactured by s Industry, Inc., of Los Alamitos, California.

Referring again to FIG. 8B, the computing device 800 may support any suitable installation device 816, such as a disk drive, a CD-ROM drive, a CD-R/RW drive, a DVD-ROM drive, a flash memory drive, tape drives of various formats, USB device, hard-drive, a network interface, or any other device suitable for installing software and programs. The computing device 800 may further include a storage device, such as one or more hard disk drives or redundant arrays of independent disks (storage devices), for storing an operating system and other related software, and for storing application software programs such as any program or software 820 for implementing (e.g., software 820 configured or designed for) the systems and methods described herein. In some embodiments, any of the installation devices 816 could be used as the storage device. In some embodiments, the operating system and the software can be run from a bootable medium.

Furthermore, the computing device 800 may include a network interface 818 to interface to the network 804 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), embodiment, the computing device 800 communicates with other computing devices 800 via any type and form of gateway or tunneling protocol such as Secure Socket Layer (SSL) or Transport Layer Security (TLS). The network interface 818 may include a built-in network adapter, network interface card, PCMCIA network card, card bus network adapter, wireless network adapter, USB network adapter, modem or any other device suitable for interfacing the computing device 800 to any type of network capable of communication and performing the operations described herein.

In some embodiments, the computing device 800 may include or be connected to one or more display devices 824a-824n. As such, any of the I/O devices 830a-830n and the I/O controller 823 may include any type or form of suitable hardware, software, or combination of hardware and software to support, enable or provide for the connection and use of the display device(s) 824a-824n by the computing device 800. For example, the computing device 800 may include any type or form of video adapter, video card, driver, and library to interface, communicate, connect or otherwise use the display device(s) 824a-824n. In one embodiment, a video adapter may include multiple connectors to interface to the display device(s) 824a-824n. In other embodiments, the computing device 800 may include multiple video adapters, with each video adapter connected to the display device(s) 824a-824n. In some embodiments, any portion of the operating system of the computing device 800 may be configured for using multiple displays 824a-824n. One ordinarily skilled in the art will recognize and appreciate the various ways and embodiments that a computing device 800 may be configured to have one or more display devices 824a-824n.

In further embodiments, an I/O device 830 may be a bridge between the system bus 850 and an external communication bus, such as a USB bus, an Apple Desktop Bus, an RS-232 serial connection, a SCSI bus, a FireWire bus, a Fire Wire 800 bus, an Ethernet bus, an AppleTalk bus, a Gigabit Ethernet bus, an Asynchronous Transfer Mode bus, a FibreChannel bus, a Serial Attached small computer system interface bus, a USB connection, or a HDMI bus.

A computing device or system 800 of the sort depicted in FIGS. 8B and 8C may operate under the control of an operating system, which controls scheduling of tasks and access to system resources. The computing device 800 can be running any operating system, such as any of the versions of the MICROSOFT WINDOWS operating systems, the different releases of the Unix and Linux operating systems, any version of the MAC OS for Apple computers, any embedded operating system, any real-time operating system, any open source operating system, any proprietary operating system, any operating systems for mobile computing devices, or any other operating system capable of running on the computing device and performing the operations described herein. Typical operating systems include, but are not limited to, Android, produced by Google Inc.; WINDOWS 7 and 8, produced by Microsoft Corporation of Redmond, Washington; MAC OS, produced by Apple Computer of Cupertino, California; WebOS, produced by Research In Motion (RIM); OS/2, produced by International Business Machines of Armonk, New York; and Linux, a freely-available operating system distributed by Caldera Corp. of Salt Lake City, Utah, or any type and form of a Unix operating system, among others.

The computer system 800 can be any networking device, storage device, workstation, telephone, desktop computer, laptop or notebook computer, server, handheld computer, mobile telephone or other portable telecommunications device, media playing device, a gaming system, mobile computing device, or any other type or form of computing, telecommunications or media device that is capable of communication. The computer system 800 has sufficient processor power and memory capacity to perform the operations described herein.

In some embodiments, the computing device 800 may have different processors, operating systems, and input devices consistent with the device. For example, in one embodiment, the computing device 800 is a smart phone, mobile device, tablet or personal digital assistant. In still other embodiments, the computing device 800 is an Android-based mobile device, an iPhone smart phone manufactured by Apple Computer of Cupertino, California, or a Blackberry or WebOS-based handheld device or smart phone, such as the devices manufactured by Research In Motion Limited. Moreover, the computing device 800 can be any workstation, desktop computer, laptop or notebook computer, server, handheld computer, mobile telephone, any other computer, or other form of computing or telecommunications device that is capable of communication and that has sufficient processor power and memory capacity to perform the operations described herein. Aspects of the operating environments and components described above will become apparent in the context of the systems and methods disclosed herein.

It should be noted that certain passages of this disclosure can reference terms such as "first" and "second" in connection with devices signals, data, inputs, channels, and the like for purposes of identifying or differentiating one from another or from others. These terms are not intended to merely relate entities (e.g., a first input and a second input) temporally or according to a sequence, although in some cases, these entities can include such a relationship, nor do these terms limit the number of possible entities (e.g., devices) that can operate within a system or environment.

It should be understood that the systems described above can provide multiple ones of any or each of those components. In addition, the systems and methods described above can be provided as one or more computer-readable programs or executable instructions, programmable circuits, or digital logic embodied on or in one or more articles of manufacture. The article of manufacture can be a floppy disk, a hard disk, a CD-ROM, a flash memory card, a PROM, a RAM, a ROM, ASIC, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

While the foregoing written description of the methods and systems enables one of ordinary skill to make and use various embodiments of these methods and systems, those of ordinary skill will understand and appreciate the existence of variations, combinations, and equivalents of the specific embodiment, method, and examples herein. The present methods and systems should therefore not be limited by the above-described embodiments, methods, and examples, but by all embodiments and methods within the scope and spirit of the disclosure.

What is claimed is:

1. A method comprising:
identifying, by one or more processors, a presence of an error in a plurality of data storage units in a range of data storage units of an error bitmap of a redundant array of independent disks (RAID);
generating, by the one or more processors, a parity RAID request format (PRRQ) frame, the PRRQ frame identifying the range of data storage units, wherein at least one data storage unit has an error, the range of data storage units identified at least in the plurality of data storage units; and
communicating, by the one or more processors, the PRRQ frame to a controller, the controller is configured, responsive to the PRRQ frame, to recover the data in the range of data storage units in the plurality of data storage units.

2. The method of claim 1, wherein the controller, responsive to not more than one PPRQ frame, is configured to recover the data in the range of the plurality of data storage units.

3. The method of claim 1, further comprising:
generating, by the one or more processors, the PRRQ frame to include a first field identifying an offset for identifying a location of a first data storage unit of the plurality of data storage units in the range of data storage units and a second field identifying a number of data storage units in the range of data storage units.

4. A method of claim 1, wherein:
the range of data storage units is in a data segment on a storage device of the RAID.

5. The method of claim 1, wherein the error is absent in at least one data storage unit within the range of data storage units.

6. The method of claim 5, wherein the error is absent in two or more non-subsequent first data storage units within the range of data storage units between the two or more non-subsequent second data storage units.

7. The method of claim 1, wherein the error bitmap of the plurality of data storage units identifies a cluster of errors on a single storage device of the RAID.

8. The method of claim 1, wherein the error is a media error.

9. A circuitry configured to:
identify a presence of an error in a plurality of data storage units in a range of data storage units of an error bitmap of a redundant array of independent disks (RAID);
generate a parity RAID request format (PRRQ) frame, the PRRQ frame identifying the range of data storage units, wherein at least one data storage unit has an error, the range of data storage units identified at least in the plurality of data storage units; and
communicate the PRRQ frame to a controller, the controller is configured, responsive to the PRRQ frame, to recover the data in the range of data storage units in the plurality of data storage units.

10. The circuitry of claim 9, wherein the controller, responsive to not more than one PRRQ frame, is configured to recover the data in the range of the plurality of data storage units.

11. The circuitry of claim 9 further configured to:
generate the PRRQ frame to include a first field identifying an offset for identifying a location of a first data storage unit of the plurality of data storage units in the range of data storage units and a second field identifying a number of data storage units in the range of data storage units.

12. The circuitry of claim 9, wherein the range of data storage units is in a data segment on a storage device of the RAID.

13. The circuitry of claim 9, wherein the error is absent in at least one data storage unit within the range of data storage units.

14. The circuitry of claim 13, wherein the error is absent in two or more non-subsequent first data storage units within the range of data storage units between the two or more non-subsequent second data storage units.

15. The circuitry of claim 9, wherein the error bitmap of the plurality of data storage units identifies a cluster of errors on a single storage device of the RAID.

16. A system comprising:
one or more processors configured to:
identify a presence of an error in a plurality of data storage units in a range of data storage units of an error bitmap of a redundant array of independent disks (RAID);
generate a parity RAID request format (PRRQ) frame, the PRRQ frame identifying the range of data storage units, wherein at least one data storage unit has an error, the range of data storage units identified at least in the plurality of data storage units; and
communicate the PRRQ frame to a controller is configured, responsive to the PRRQ frame, to recover the data in the range of data storage units in the plurality of data storage units.

17. The system of claim 16, wherein the controller, responsive to not more than one PRRQ frame, is configured to recover the data in the range of the plurality of data storage units.

18. The system of claim 16, wherein the one or more processors are further configured to:
generate the PRRQ frame to include a first field identifying an offset for identifying a location of a first data storage unit of the plurality of data storage units in the range of data storage units and a second field identifying a number of data storage units in the range of data storage units.

19. The system of claim 16, wherein the range of data storage units is in a data segment on a storage device of the RAID.

20. The system of claim 16, wherein the error is absent in at least one data storage unit within the range of data storage units.

* * * * *